United States Patent [19]

Di Giovanni

[11] E Re. 31,027

[45] Reissued Sep. 14, 1982

[54] LOCKING HOOD ASSEMBLY FOR FLOW CONTROL DEVICE

[76] Inventor: Bernard A. Di Giovanni, 96 Davis Ave., Hauppage, N.Y. 11787

[21] Appl. No.: 945,561

[22] Filed: Sep. 25, 1978

Related U.S. Patent Documents

Reissue of:

[64] Patent No.: 4,024,740
Issued: May 24, 1977
Appl. No.: 684,573
Filed: May 10, 1976

[51] Int. Cl.[3] ..... G05G 5/00; F16K 35/00

[52] U.S. Cl. ..... 70/175; 70/34; 137/384

[58] Field of Search ..... 70/178, 177, 179, 175, 70/176, 184, 185, 186, 34, 54; 137/385, 383

[56] References Cited

U.S. PATENT DOCUMENTS

| | | | |
|---|---|---|---|
| 1,459,688 | 6/1923 | Parkinson | 70/178 |
| 1,571,669 | 2/1926 | Hompe | 70/176 |
| 1,795,839 | 3/1931 | Credle | 70/175 |
| 2,016,797 | 10/1935 | Burns et al. | 70/176 |
| 2,092,572 | 9/1937 | Deane | 70/165 X |
| 2,979,076 | 4/1961 | Kish | 137/385 X |
| 3,002,368 | 10/1961 | Moberg | 70/14 |
| 3,033,016 | 5/1962 | Moberg | 70/176 |
| 3,186,196 | 6/1965 | Moberg | 70/34 |
| 3,391,554 | 7/1968 | Wrenshall | 70/178 |
| 3,540,468 | 11/1970 | Finck | 137/383 |
| 3,554,218 | 1/1971 | Smith | 70/176 X |
| 3,560,130 | 2/1971 | Horhota | 137/385 X |
| 3,714,802 | 2/1973 | Morse et al. | 70/34 |

FOREIGN PATENT DOCUMENTS

| | | | |
|---|---|---|---|
| 540577 | 12/1931 | Fed. Rep. of Germany | 70/178 |
| 1115063 | 10/1961 | Fed. Rep. of Germany | 70/175 |

*Primary Examiner*—J. Franklin Foss
*Attorney, Agent, or Firm*—Brooks, Haidt, Haffner & Delahunty

[57] ABSTRACT

Locking hood assembly for mounting on a gas service head valve of the lubricated plug type to prevent unauthorized opening of the valve. Locking hood assembly comprises a generally cylindrical main body or hood which covers the valve stem and stop collar when it is mounted on the valve thus preventing valve operation, the hood being attached to the valve using the removable buttonhead grease fitting which is conventionally an element of the valve itself. Assembly further comprises a cover cap which conceals the grease fitting after the hood is mounted on the valve; and a barrel lock which locks the cover cap to the main body or hood. The main body further has an enlarged, generally oval-shaped, peripherally extending skirt portion which fits over the oval-shaped gland seal cover plate of the valve when the hood is in place and prevents access to the gland seal cover bolts and to the normal spacing between the gland seal cover and the valve housing.

23 Claims, 6 Drawing Figures

LOCKING HOOD ASSEMBLY FOR FLOW CONTROL DEVICE

Matter enclosed in heavy brackets [ ] appears in the original patent but forms no part of this reissue specification; matter printed in italics indicates the additions made by reissue.

This invention relates to locking devices for preventing unauthorized operation of flow control devices, such as valves and switches, and more particularly to such locking devices as are mounted on the control device to engage the operating element thereof to prevent its movement.

Public utility companies supply electric energy, fuel, and water to their customers by way of service head valves and circuit breakers or switches located on or near the premises of each customer. Although the invention in its broader aspects may have other uses, for example as a means for locking electric power supply relays or switches, water supply shutoff valves, or other manually or automatically operated valves which control the supply or rate of flow of liquid or gaseous chemicals or the like, it was made while attempting to devise a relatively foolproof lockable hood for manufacture in substantial quantities to be installed on literally thousands of existing gas service head valves in homes, apartment houses, factories and other buildings when the heating gas supply service thereto is to be shut off, to prevent unauthorized opening of the valve and consequent unauthorized recommencement of the service. The invention will therefore be described in connection with such use.

Locks such as those described in U.S. Pat. Nos. 3,002,368 and 3,714,802 have been devised for the purpose of preventing unauthorized operation of such valves or switches. However, they have not been entirely successful in view of the propensity of some persons to tamper with such locks in an attempt to remove them by bending or cutting parts of the lock or of the valve or switch structure on which the lock is mounted. Such persons may use special tools which they have devised for the purpose, or for the purpose of by-passing the lock and effecting operation of the valve or switch in spite of the presence of the lock. A further disadvantage of many previously known locking devices is that they require modification of the valve or switch itself either to permit installation of the lock, or to render it useful. Such required modifications in many thousands of gas service head valves at the times when such valve locks are to be installed would, of course, substantially increase the cost of installation. For example, in a city like New York City where the population numbers several million persons, merely the normal movement of persons to new homes and apartments requires interruption of gas service to literally hundreds of thousands of homes or apartments each year. Even a few minutes spent modifying each such existing gas service head valve to receive such a locking device would require thousands of man-hours of servicemen's time, with resulting increased costs.

Accordingly, it is intended by the present invention to provide a removable hood or shield which may be locked on to a control device such as a gas service head valve, to prevent its operation, in a manner which does not require any physical modification or marring of the control device or valve itself. Nor should the attachment of the hood or shield require the uses of special fasteners, screws or the like as would create difficulty or require adjustment or undue consumption of time during installation. Ideally, the gas service locking device would be carried by the gas serviceman and simply placed and locked on the service head valve in a very few minutes, to be removed as easily at a later time when the gas service is to be restored.

It is further intended that, excepting for size differences, the same locking hood device will be usable with either of the two common types of lubricated plug valves now commonly used as gas service head valves in public utility systems, these being of the types manufactured and sold by Walworth Company of Bala Cynwyd, Pennsylvania, and by Rockwell International, of Pittsburgh, Pennsylvania. Although of slightly different configuration, both of these lubricated plug valves are operated by a manually pivotable valve stem which projects outwardly from the valve housing. Both types further have a button-head type of grease fitting for lubricating the valve, the grease fitting being removably mounted on the projecting end of the valve stem.

Generally describing the invention, it utilizes a removable and replaceable part of the utility service control device itself to secure the main body of the locking hood to the control device, the locking hood assembly further including a cover cap to conceal or prevent access to such removable part of the valve after the locking hood main body has been thereby secured, and a relatively tamperproof lock for locking the cover cap in place. In its preferred embodiment for use with both of the aforementioned Walworth and Rockwell types of lubricated plug valves, the main body of the locking hood assembly has generally cylindrical shape to fit over the projecting valve stem by which the valve is operated, the locking hood main body being secured to the valve stem using the removable grease fitting which is normally a part of the valve and is mounted on the end of the valve stem. For this purpose, the locking hood main body includes a top closure portion spanning across its cylindrical shape adjacent to the top end thereof, the top closure portion being apertured appropriately to permit the threaded attachment stem of the grease fitting to pass therethrough as the grease fitting is again mounted on the end of the valve stem to secure the main body of the hood to the valve. The wider buttonhead portion of the grease fitting engages the top closure portion to retain the hood in place on the valve. The referred to cover cap of the locking hood assembly is placed on a cap-receiving portion of the main body of the hood to cover the buttonhead grease fitting when the latter is in place. A barrel lock, which may be of a known type, locks the cover in place on the cap-receiving portion of the hood.

In addition, the opposite or lower end of the main body of the locking hood assembly has a generally oval-shaped depending skirt portion which surrounds and extends below the correspondingly oval-shaped, conventional gland seal cover plate of these lubricated plug valves, the oval-shaped skirt preventing pivotal movement of the locking hood in its mounted position on the valve, and also preventing access to the valve stop collar by which the valve might be operated, and to the gland cover bolts which are normally exposed between the gland cover plate and the valve housing.

The locking hood assembly is installed after the main gas service head valve has been manually closed by pivoting its projecting valve stem to the valve-closed position. As previously noted, the grease fitting on the valve stem is used to secure the main body of the locking hood assembly in place. That is, the buttonhead grease fitting has a hexagonal-shaped head portion by which it is unscrewed from the exposed end of the valve stem and, when the grease fitting has been removed, the generally cylindrical main body of the locking hood assembly is placed over the valve stem, its oval-shaped depending skirt fitting over and surrounding the gland seal cover plate of the valve as also previously mentioned. The buttonhead grease fitting is then replaced, its threaded attachment stem being passed through the apertured top closure portion of the locking hood main body and into engagement with the existing threaded aperture on the end of the valve stem. When it is tightened, the enlarged head portion of the grease fitting retains the top closure portion and, hence, the locking hood main body on the valve. The valve stem is then concealed within the cylindrical main body of the locking hood assembly, and is inaccessible for turning with a wrench to open the valve.

The cover cap is placed on the cap-receiving portion of the main body to conceal the buttonhead grease fitting, and is locked in place using a pencil-shaped barrel lock which passes through laterally aligned apertures formed in the main body cap-receiving portion and in the cover cap. The barrel lock, which is generally described in the aforementioned U.S. Pat. No. 3,714,802, can only be opened using a special-shaped key.

Because of the oval-shape configuration of the skirt of the locking hood main body and its surrounding relation to the gland cover plate and to a portion of the valve housing therebelow, the locking hood main body cannot be pivoted on the valve, as might be a means of effecting removal of the grease fitting and thus the hood itself even though direct access to the fitting is not achieved. Further, the fingergrip portion of the cover cap has conical shape so that it is not easily gripped by a heavy wrench or other tool as might be used for force-shearing of the parts. Moreover, the main body, cap and lock are each made of hardened steel so that none of the parts can be easily cut or deformed. Thus, unauthorized access to the main gas service head valve is virtually assured.

These and other objects, features and advantages will become more fully apparent from the following detailed description of the invention. The description makes reference to the accompanying drawings, in which.

Figure 1:
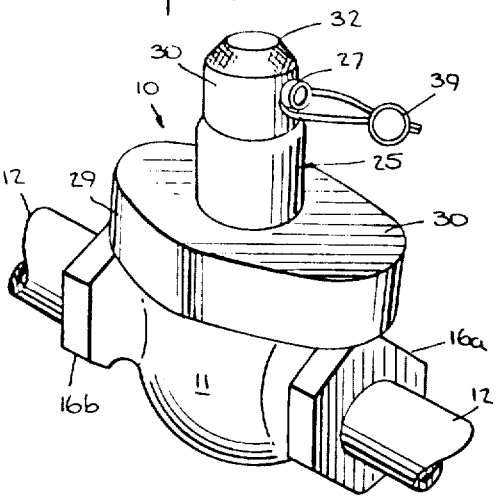
FIG. 1 is a perspective view showing a locking hood assembly in accordance with the invention as it appears when locked in place on a lubricated plug-type gas service head valve.
Figure 2:
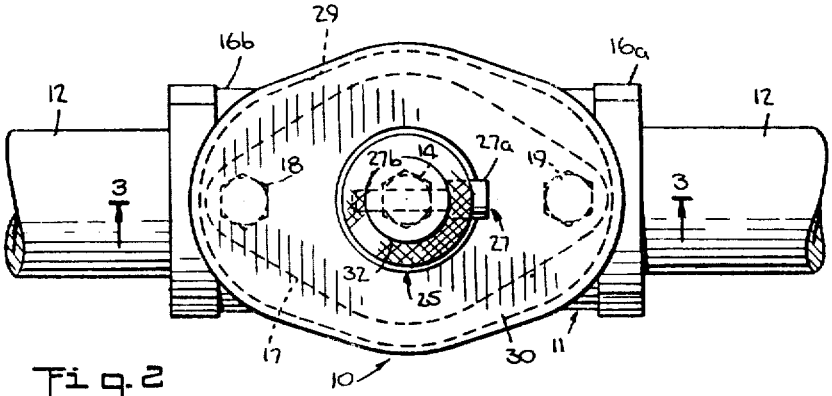
FIGS. 2 and 3 are, respectively, a plan view and a side-sectional elevation of the lubricated plug valve and locking hood assembly shown in FIG. 1.
Figure 3:
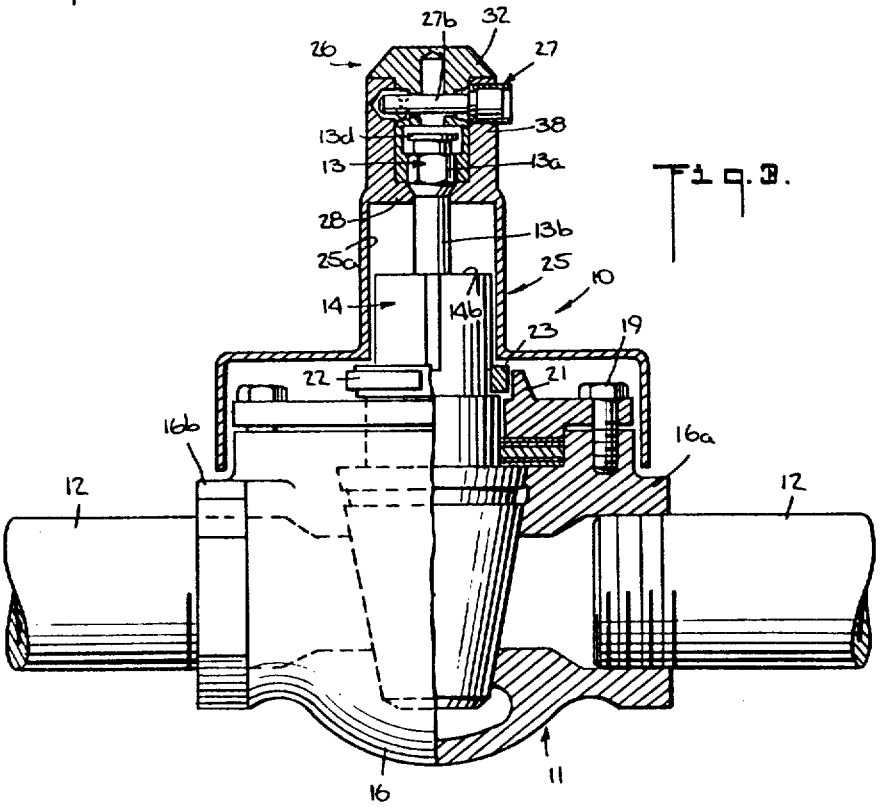

Referring to the drawings, a locking head assembly in accordance with the invention is generally indicated by reference numeral 10, and is shown in FIGS. 1–3 as it would appear when locked in its position on a conventional type lubricated plug valve, generally indicated by reference numeral 11, which will be understood to be the main gas service head valve in a gas utility supply pipeline 12 leading into a home or similar place.

Public utility service Codes of various government agencies require that the main gas service head valve in a gas supply line must be of such lubricated plug type. Such lubricated plug valves are well-known and, as previously noted, may be of a type manufactured and sold by either Walworth Co. of Bala Cynwyd, Pennsylvania or by Rockwell International, Pittsburgh, Pennsylvania. The valve has as its primary seal a system of grease-containing channels for preventing any leakage flow of gas. This grease or lubricant is replenished by injecting it into the valve via a buttonhead grease fitting which is mounted on the exposed end of the operating stem of the valve. In the drawings, this buttonhead grease fitting is generally indicated by reference numeral 13, and the operating stem of the lubricated plug valve is indicated by reference numeral 14. As indicated by the showing 13c in FIG. 4, the grease fitting attachment stem 13b is threaded at its lower end and is received in a correspondingly threaded aperture 14a formed in the end of the valve stem. The grease fitting 13 further includes an enlarged head portion 13a which is hexagonal in shape for tightening the grease fitting in place using a wrench or similar tool. The buttonhead portion 13d on the upper end of the grease fitting 13 has conventional shape for connection of a grease gun when the valve lubricant is to be replenished.

Completing the description of the lubricated plug valve 11 insofar as pertinent to a description of the present invention, the valve body or housing is generally indicated by reference numeral 16, the gas supply line 12 being threadedly attached at both ends 16a, 16b as shown. A conventional gland seal cover plate 17 which as seen in FIG. 2 has generally oval-shape, is attached to the valve housing 16 by a pair of gland cover bolts 18, 19 which pass through the cover and are threaded into the valve housing, as seen in FIG. 3. As will also be noted from FIGS. 3 and 4, the gland seal cover plate 17 is usually spaced a slight distance away from the top of the valve housing, the spacing being generlly indicated by reference numeral 20, thus leaving the shanks of the respective gland cover bolts 18, 19 exposed as they span across the spacing 20. If the spacing 20 is left uncovered, it is apparent that the exposed gland cover bolts 18, 19 might be cut using a hacksaw, and the valve stem 14 could be turned, and thus the valve could be opened, by "reverse" engagement of the integrally formed gland cover stop 21 on the plate with the radially outward projecting stop 22 formed on the valve stop collar 23 which, in turn, is attached to the valve stem 14. Accordingly, it is believed that the locking hood assembly of the invention must incorporate means to prevent access to the gland cover plate spacing 20 so as to prevent access to the shanks, as well as to the boltheads of the gland cover bolts 18, 19.

Figure 4:
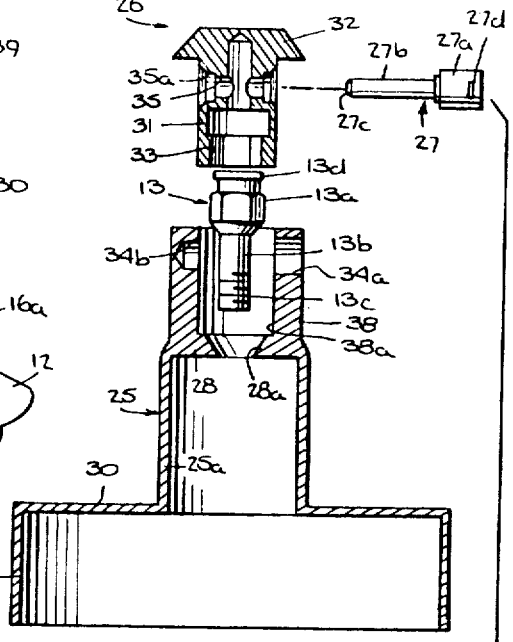
FIG. 4 is an exploded side elevational view, partly in cross-section, illustrating the arrangement of the locking hood assembly of FIGS. 1–3 and its manner of placement on the gas service head valve.

Referring now to the details of the locking hood assembly of the invention, as perhaps best illustrated in FIG. 4 the locking hood assembly 10 includes a main body 25, a cover cap 26 and a lock 27. As will be noted from FIGS. 1 and 2, the main body 25 may be said to have generally cylindrical interior shape for fitting over and thus concealing the outwardly projecting valve stem 14. Adjacent to its upper end an integrally formed top closure portion 28 spans across and substantially closes the cylindrical main body 25, there being only a central aperture 28a therein through which the grease fitting attachment stem 13b is passed when resecuring the grease fitting 13 to the valve stem 14 to hold the main body 25 on the valve. It will be noted that the aperture 28a is formed having an upwardly facing bevel for receiving the correspondingly shaped, downwardly facing bevelled portion at the underside of the grease fitting head portion 13a.

At its opposite, lower end the main body 25 has a integrally formed depending skirt portion 29 which, as seen in FIG. 2, has generally oval-shape to fairly closely surround the similarly shaped gland seal cover plate 17. A surface portion 30 of the main body 25 connects the oval-shaped skirt 29 to the central cylindrical portion of the main body, as shown.

Referring to FIG. 3, and depending upon the height of its skirt 29 and the length of the grease fitting attachment stem 13b, the main body 25 of the locking hood assembly may fit somewhat loosely on the valve 11, or may be clamped somewhat tightly thereto by pressure exerted by the bevelled underside of the grease fitting head portion 13a pressing against the bevelled top closure aperture 28a assuming that the height of the skirt 29 is such that it will abut against the valve housing ends 16a, 16b. Alternatively, and although not illustrated, it will be understood that the height of the grease fitting attachment stem 13b and that of the locking hood assembly main body 25 may be shortened so that the bevelled underside of the grease fitting head portion 13a will press the top closure portion 28 directly against the top, exposed end 14b of the valve stem 14.

In any event, it will be understood that the main body 25 of the locking hood assembly cannot be pivoted on the valve 11, and that it shields the gland cover bolts 18, 19 and the valve stop collar 23, as well as the valve stem 14, from access.

So that the grease fitting 13 cannot be removed, the locking hood assembly cover cap 26 is placed on an upwardly projecting cap-receiving portion 38 of the main body 25, as perhaps best understood from FIG. 4. The cap-receiving portion 38 is formed integrally with the main body 25, and provides a cylindrically shaped interior opening 38a. As will be understood from FIG. 3, the height of the cap-receiving portion 38 is considerably greater than the vertical height of the buttonhead grease fitting which is also received therein. For reasons as will be explained, the inside diameter of the cap-receiving portion 38 is considerably larger than the lateral width dimension of the grease fitting head portion 13a. The cover cap 26 has a correspondingly sized cylindrical body portion 31, i.e., its outer diameter is only slighty smaller than the inside diameter of the cylindrical cap-receiving portion 38 to be slidably received in the latter, and a knurled fingergrip portion 32. Thus, because of the comating cylindrical surfaces, the cover cap 26 is pivotable when it is seated within the cap-receiving portion 38.

The cover cap cylindrical body portion 31 has an axially extending central aperture 33, the lower end of which is hexagonally-shaped to fit over and engage the hexagonal-shaped head portion 13a of the grease fitting 13, as shown in FIG. 3. Thus, the cover cap 26 can be used as a tool to tighten and loosen the grease fitting 13 in its threaded engagement with the valve stem 14, simply by grasping the knurled grip portion 32 using the hand and turning the cover cap. It is for this reason that the interior diameter 38a of the cap-receiving portion 38 must be considerably greater than the lateral width dimension of the grease fitting head portion 13a, i.e., to receive the cover cap cylindrical body portion in which the hexagonal aperture is formed. Of course, the height of the cover cap central aperture 33 must be adequate to receive the upper buttonhead portion 13d of the grease fitting 13, as also seen in FIG. 3.

Figure 5:
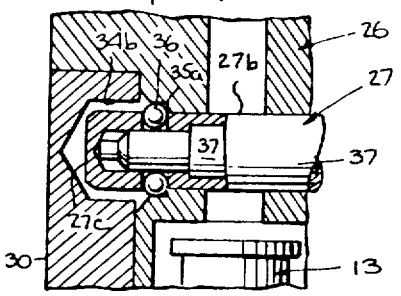
FIGS. 5 and 6 are enlarged, fragmentary cross-sectional views illustrating the manner of locking and unlocking the locking hood assembly on the valve.
Figure 6:
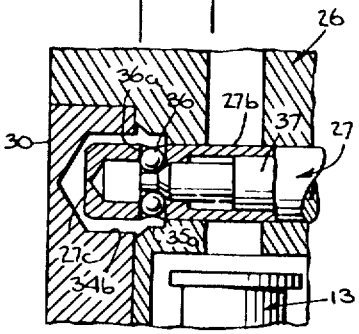
Figure 6:
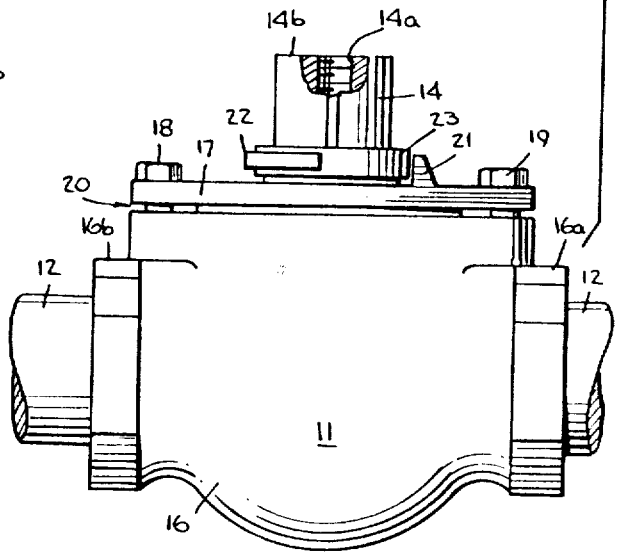

To prevent removal of the cover cap 26 it must be locked in place on the main body 25 of the locking hood assembly. For this purpose a barrel lock 27 is received within appropriately sized apertures which form a throughhole in the cap-receiving portion 38 and the cover cap body portion 31, these apertures being respectively indicated by reference numerals 34a, 34b and 35. It will be noted that the diameter of the aperture 34a is enlarged to receive the enlarged head 27a of the barrel lock 27. As seen in FIG. 3 the lock shank 27b is passed laterally through the aperture 34a and the cover cap aperture 35, and into the partial aperture 34b at the opposite side of the cap receiving portion 38. Referring to FIGS. 5 and 6 which show details of the manner in which the barrel lock 27 is locked in place, the lock 27 has peripherally disposed balls 36 which are forced in radially outward direction of the lock shank 27b by an axial plunger 37 as it is moved inwardly, from the position shown in FIG. 6 to that shown in FIG. 5, by a specially adapted lock key (not shown). The balls 36 are received in an enlarged diameter end portion 35a of the cover cap aperture 35, as seen in FIG. 5, thus preventing the lock 27 from being removed from the apertures 34a, 34b and 35. The bitter end 27c of the barrel lock 27 is received in the partial aperture 34b, as seen in either of FIGS. 5 and 6.

When by using the special key the plunger 37 is withdrawn to its position as shown in FIG. 6, i.e., moved to the right from its position as shown in FIG. 5, the peripherally disposed balls 36 move into appropriate circumferentially disposed recesses 36a in the lock shank 27b, permitting the lock 27 to be withdrawn from the apertures 34a, 34b and 35.

As seen in FIG. 1, a wire and lead seal 38 is passed through a slot 27d in the head end 27a of the barrel lock, the wire covering the keyhole opening and indicating unauthorized tampering if the seal has been removed.

The locking head assembly 10 is installed on the valve 11 in the manner indicated in FIG. 4. That is, first the grease fitting 13 is unscrewed from its threaded engagement with the valve stem 14, and then the main body 25 of the locking head assembly is placed over the valve stem 14 and on to the valve 11, so that its cylindrical-shaped interior 25a is disposed around the pivotable valve stem 14, and its depending skirt 29 surrounds the fixed gland seal cover plate 17 and the similarly shaped upper end of the valve housing 16 which is immediately therebelow, as seen in FIG. 3. The grease fitting attachment stem 13b is then passed through the top closure aperture 28a of the locking hood and is again threadedly connected to the valve stem 14. The threading of the grease fitting on to the valve stem 14 is conveniently effected using the cover cap 26 as a tightening tool, its hexagonal aperture 33 being placed in engagement with the grease fitting head portion 13a as would a wrench.

After the grease fitting 13 has been tightened the pivoted position of the cover cap 26 is adjusted so that its lateral aperture 35 is in alignement with the apertures 34a, 34b on the main body of the locking hood assembly (this possibly requiring some adjustment of the position of the grease fitting 13), and the barrel lock 27 is inserted into the aligned apertures 34a, 34b and 35 and locked in place. The wire and lead seal 38 is then formed, by passing its wire through the lock aperture 27d and forming the lead seal using a conventional sealing tool.

The knurled finger grip portion 32 of the cover cap has forty-five degree frusto-conical shape so that it cannot be easily gripped by any tool normally found in the household, as might be used to force the cap in an attempt to shear off the barrel lock 27. All of the parts are of hardened steel so that they are not easily cut or deformed, and the lock 27 can be opened using only a special key. Thus, when the assembly 10 is mounted and locked on the valve, it is virtually tamper-proof.

To remove the locking hood assembly 10 from the gas service head valve 11, the procedure is reversed. That is, the seal 38 is broken, and the barrel lock 27 is unlocked and removed. Grasping its knurled grip portion 32, the cover cap 26 is twisted in counterclockwise direction to unscrew the grease fitting 13 from its threaded engagement with the valve stem 14. After removing the grease fitting, the main body 25 is lifted off the valve 11. The grease fitting 13 is then again threadedly mounted on the valve stem 14.

Thus, there has been described a locking hood assembly for preventing unauthorized operation of a flow control device on which it is mounted, and which otherwise achieves the objects of the invention. Although a preferred embodiment has been described with reference to a lubricated plug-type shut-off valve in a gas supply line, it will be understood that the locking hood assembly may be modified, or used on the other flow control devices including other types of fluid control valves or even electric switches, without departing from the principles of the invention.

What is claimed is:

1. A flow control device having a fixed portion and an operating member which is movable with respect to said fixed portion; a locking hood assembly mounted on said flow control device for preventing said movement of its said operating member, said locking hood assembly comprising a main body having an interior configuration fitting on and substantially surrounding said operating member; and releasable means retaining said main body in its said fitting relation with respect to said operating member; said locking hood assembly further comprising a removable cover cap on said main body covering and thereby preventing access to said releasable retaining means, and removable lock means for locking said cover cap in said position on said main body.

2. The combination according to claim 1 wherein said flow control device is a fluid flow control valve whose said operating member is a pivotable valve stem which projects outwardly from said fixed portion of the valve, and said main body of the locking hood assembly has centrally apertured configuration and surrounds at least the projecting portion of said valve stem, said centrally apertured configuration of the main body including an end portion which is disposed closely adjacent to said fixed portion of the valve.

3. The combination according to claim 2 wherein said fluid flow control valve includes a valve housing, said fixed portion of the valve is a generally oval-shaped gland seal cover plate attached to said valve housing, said main body of the locking hood assembly housing substantially cylindrical shape and further having a correspondingly oval-shaped depending peripheral skirt fitting on and substantially surrounding the periphery of said gland seal cover-plate whereby pivotal movement of said main body with respect to said valve is prevented, said main body further comprising a surface portion extending between the outer peripheries of said main body end portion and said skirt.

4. The combination according to claim 3 wherein said gland seal cover-plate is spaced away from said valve housing and is attached to said valve housing by a pair of gland cover bolts which extend across the spacing between said gland sead cover-plate and said housing, and said main body skirt has depending height whereby said skirt spans across said spacing between said gland seal cover-plate and said housing, thereby preventing access to said gland cover bolts.

5. The combination according to claim 1 wherein said releasable means comprises a removable element of said control device itself.

6. The combination according to claim 2 wherein said fluid flow control valve is a lubricated plug valve, and said releasable means retaining said locking hood main body on said operating member is a removable buttonhead grease fitting mounted on the outwardly projecting end of said valve stem, said buttonhead grease fitting including a head portion for receiving a grease gun and a smaller diameter attachment stem depending from said head portion, said centrally apertured configuration of said locking hood main body including a top closure portion covering the outwardly projecting end of said valve stem, said top closure portion having means defining a central aperture thereof having diameter only slightly larger than said grease fitting attachment stem but smaller than the width dimension of said grease fitting head portion, said grease fitting attachment stem passing through said top closure aperture and being connected to said end of the valve stem.

7. The combination according to claim 5 wherein said head portion of the buttonhead grease fitting has a downwardly facing bevelled peripheral portion, and said means defining a central aperture of said top closure portion provides an upwardly facing bevelled periphery of said aperture receiving said bevelled periphery of said grease fitting head portion.

8. The combination according to claim 6 wherein said main body configuration further includes a cap-receiving portion projecting upwardly substantially from said top closure portion and having means defining a generally cylindrical central opening thereof which is axially aligned with said central aperture of said main body top closure portion, the height of said cap-receiving portion above said main body top closure portion being greater than the height of said grease fitting head portion, said cover cap being mounted on said cap-receiving portion and said lock means locking said cover cap thereon.

9. The combination according to claim 8 wherein said outwardly projecting end of said valve stem has means defining a threaded aperture for receiving said grease fitting attachment stem, said grease fitting attachment stem is in threaded engagement with said threaded aperture of the valve stem, and said grease fitting head portion is polygonal-shaped, said cylindrical central opening of the cap-receiving portion having diameter which is substantially larger than the lateral width dimension of said grease fitting head portion, said cover cap has a generally cylindrical body portion whose outer diameter is only slightly smaller than said inside diameter of the cap-receiving portion opening and is pivotably received in the latter, said cover cap cylindrical body portion having means defining a polygonal-shaped aperture extending inwardly from that end thereof which is received in said cap-receiving portion opening and engaging said polygonal-shaped grease fitting head portion, and said cover cap further has a grip portion disposed exteriorly of said main body cap-receiving portion whereby, when said lock means is removed and said cover cap grip portion is pivoted, said grease fitting can be removed from its said threaded engagement with said valve stem.

10. The combination according to claim 9 wherein said grip portion has substantially conical shape.

11. The combination according to claim 9 wherein said lock means is a barrel lock extending in lateral direction through said main body cap-receiving portion and into said cover cap cylindrical body portion at a location above said grease fitting head portion, said cap-receiving portion and said cover cap cylindrical body portion having means defining aligned and laterally extending apertures for receiving said barrel lock.

12. A locking hood assembly for mounting on a flow control device to prevent access to a movable operating member of the latter, said locking hood assembly comprising a main body having substantially cylindrical configuration for mounting on said operating member and means for receiving means to retain said main body in its said mounted relation, a removable cover cap for mounting on said main body to cover and thereby prevent access to said means for receiving said retaining means, and removable lock means for locking said cover cap in said position on said main body.

13. A locking hood assembly according to claim 12 wherein said means for receiving said retaining means comprises a top closure portion of said main body which spans across its cylindrical opening at a location adjacent to one end thereof, said top closure portion having means defining a central aperture thereof having diameter which is substantially smaller than that of said one end of the cylindrical main body.

14. A locking hood assembly according to claim 13 wherein said main body thereof further has an enlarged peripheral skirt depending from the opposite end thereof and a surface portion extending between the outer peripheries of said cylindrical main body end and said enlarged skirt.

15. A locking hood assembly according to claim 13 wherein said main body further comprises a cylindrical cap receiving portion projecting upwardly substantially from said top closure portion and axially aligned with said cylindrical main body, said cover cap being engageable with said cap-receiving portion and said lock means being engageable with said cap-receiving portion and said cover cap to lock the same together.

16. A locking hood assembly according to claim 15 wherein said cover cap includes a generally cylindrical body portion whose outer diameter is only slightly smaller than the inside diameter of said cap-receiving portion for being pivotably received in the latter, said cover cap cylindrical body portion having means defining a polygonal-shaped aperture extending inwardly from that end thereof which is received in aid cap-receiving portion.

17. A locking hood assembly according to claim 16 wherein said cover cap further includes a grip portion which is disposed exteriorly of said main body cap-receiving portion when said cover cap is mounted on said main body, said grip portion having substantially conical shape.

18. A locking hood assembly according to claim 16 wherein said lock means is a barrel lock, and said main body cap-receiving portion and said cover cap have alignable apertures for receiving said barrel lock.

*19. Locking means for a gas valve having in combination a body, a rotatable valve member therein, a valve stem for rotating such member and having an axial grease duct, a shroud fitting non-rotatably on the body and having a sleeve portion enclosing the valve stem, screw means engaging in the grease duct and fixing the sleeve portion of the shroud on the end of the valve stem, driving means for the screw means closing the end of the sleeve portion, and a bolt lock extending transversely of the sleeve portion preventing rotation of the driving means.*

*20. Locking means for a gas valve having a body with a valve seat, a rotatable valve-closing member in the body to engage such seat, a shroud fitting non-rotatably on the body to prevent access to such member, screw means to fix the shroud directly on the valve member with capacity for the shroud's removal to permit rotation of the valve member to control the gas flow, screw actuating means barring access to the screw means, and a bolt type lock adapted to bar relative rotation between the shroud and the screw means.*

*21. Locking means for a gas valve having a body, a rotatable valve-closing member therein, a shroud fitting non-rotatably on the body, screw means fixing the shroud directly on the valve member, actuating means for the screw means, and a key-operated bolt type lock adapted to bar relative rotation between the shroud and the screw-actuating means.*

*22. A service access device in a utility service system, and a locking hood assembly mounted on said device for preventing access thereto, said locking hood assembly comprising a main body having an interior configuration fitting on and substantially covering said device, releasable means retaining said main body in its said fitting relation with respect to said device, removable cover means on said main body covering and thereby preventing access to said releasable retaining means, and removable lock means for locking said cover means in said position on said main body.*

*23. A locking hood assembly for mounting on a device which is a part of a utility service system to prevent access thereto for tampering with the service, said locking hood assembly comprising a main body for mounting on said device to prevent such access and means for receiving means to retain said main body in its said mounted relation, a removable cover cap for mounting on said main body to cover and thereby prevent access to said means for receiving said retaining means, and removable lock means for locking said cover cap in said position on said main body.*

* * * * *